US010678959B2

(12) United States Patent
Brochu et al.

(10) Patent No.: US 10,678,959 B2
(45) Date of Patent: Jun. 9, 2020

(54) CREATING GRADIENTS OF DIFFERENT MATERIALS FOR THREE-DIMENSIONAL MODELS IN COMPUTER AIDED DESIGN APPLICATIONS

(71) Applicant: Autodesk, Inc., San Rafael, CA (US)

(72) Inventors: Tyson Andre Brochu, Vancouver (CA); Ryan Michael Schmidt, Toronto (CA)

(73) Assignee: Autodesk, Inc., San Rafael, CA (US)

( * ) Notice: Subject to any disclaimer, the term of this patent is extended or adjusted under 35 U.S.C. 154(b) by 148 days.

(21) Appl. No.: 15/917,265

(22) Filed: Mar. 9, 2018

(65) Prior Publication Data

US 2018/0276316 A1    Sep. 27, 2018

Related U.S. Application Data

(60) Provisional application No. 62/475,473, filed on Mar. 23, 2017.

(51) Int. Cl.
| | |
|---|---|
| *G06F 30/00* | (2020.01) |
| *G06T 17/10* | (2006.01) |
| *B33Y 50/02* | (2015.01) |
| *G06T 17/20* | (2006.01) |
| *G06T 17/00* | (2006.01) |

(Continued)

(52) U.S. Cl.
CPC ............ *G06F 30/00* (2020.01); *B33Y 50/00* (2014.12); *B33Y 50/02* (2014.12); *G06F 30/23* (2020.01); *G06T 17/00* (2013.01); *G06T 17/10* (2013.01); *G06T 17/20* (2013.01); *G06T 19/20* (2013.01);

(Continued)

(58) Field of Classification Search
None
See application file for complete search history.

(56) References Cited

U.S. PATENT DOCUMENTS

| | | |
|---|---|---|
| 10,452,788 B2 | 10/2019 | Schmidt et al. |
| 2010/0215856 A1 | 8/2010 | Kritchman |

(Continued)

OTHER PUBLICATIONS

Azevedo et al., "Preserving geometry and topology for fluid flows with thin obstacles and narrow gaps," SIGGRAPH '16 Technical Paper, Jul. 24-28, 2016, 12 pages.

(Continued)

*Primary Examiner* — Carlos R Ortiz Rodriguez
(74) *Attorney, Agent, or Firm* — Fish & Richardson P.C.

(57) ABSTRACT

Methods, systems, and apparatus, including medium-encoded computer program products, for creating one or more gradients of different materials for a three dimensional (3D) surface model include, in one aspect, a system including: an additive manufacturing machine designed to use different materials in combination with each other when manufacturing objects; and means for creating a discretized gradient for a 3D surface model of an object, to be manufactured using the additive manufacturing machine, by inserting one or more 3D surfaces into the 3D surface model at specified locations, thereby creating a non-manifold version of the 3D surface model having multiple discrete volumetric regions, and assigning a material specification to each of the discrete volumetric regions, each of the material specifications being either a single one of the different materials or a specified combination of the different materials, which are usable by the additive manufacturing machine to manufacture the object.

20 Claims, 5 Drawing Sheets

(51) Int. Cl.
  G06T 19/20 (2011.01)
  B33Y 50/00 (2015.01)
  G06F 30/23 (2020.01)
  G06F 119/18 (2020.01)
(52) U.S. Cl.
  CPC .. *G06F 2119/18* (2020.01); *G06T 2219/2021* (2013.01)

(56) References Cited

U.S. PATENT DOCUMENTS

| | | |
|---|---|---|
| 2011/0087350 A1 | 4/2011 | Fogel et al. |
| 2014/0228997 A1 | 8/2014 | Phillips et al. |
| 2016/0019319 A1 | 1/2016 | Shtilerman |
| 2016/0096318 A1 | 4/2016 | Bickel et al. |
| 2017/0061036 A1 | 3/2017 | Schmidt et al. |

OTHER PUBLICATIONS

Barki et al, "Exact, robust, and efficient regularized Booleans on general 3D meshes," Computer and mathematics with applications, Elsevier, 2015, 70(6):1235-1254.
Batty, "A cell-centred finite volume method for the Poisson problem on non-graded quadtrees with second order accurate gradients," Journal of Computational Physics, Nov. 25, 2016, 33 pages.
Batty et al, "A Fast variational framework for accurate solid-fluid coupling," Eurographics/ACM SIGGRAPH Symposium on Computer Animation, 2008, 7 pages.
Batty et al, "A simple finite volume method for adaptive viscous liquids," Eurographics/ACM SIGGRAPH Symposium on Computer Animation, 2011, 7 pages.
Batty et al, "Accurate viscous free surfaces for buckling, coiling, and rotating Liquids," ACM SIGGRAPH/Eurographics Symposium on Computer Animation 2008, 10 pages.
Batty et al., "Discrete viscous sheets," ACM SIGGRAPH 2012, Transactions on Graphics, 31(4), 2012, 7 pages.
Batty, "Simulating viscous incompressible fluids with embedded boundary finite difference methods," PhD Thesis, University of British Columbia, Sep. 2010, 255 pages.
Batty et al, "Tetrahedral embedded boundary methods for accurate and flexible adaptive fluids," Eurographics 2010, vol. 29, No. 2, 10 pages.
Batty et al, "Visual simulation of wispy smoke," ACM SIGGRAPH Sketches, 2005, 1 page.
Borodin et al., "Progressive gap closing for mesh repairing", published in Advances in Modelling, Animation and Rendering, Springer, 2002, pp. 201-213).
Bridson et al, "Computational physics in film," Science 330, 1756, 2010, 3 pages.
Brochu et al, "Matching fluid simulation elements to surface geometry and topology," ACM SIGGRAPH 2010, Transactions on Graphics, 29(4), 2010, 9 pages.
Unknown author, "Boundary representation—Wikipedia, the free encyclopedia," (Mar. 3, 2017) [online] (retrieved from https://en.wikipedia.org/wiki/Boundary_representation), 4 pages.
Da et al., "Multimaterial mesh-based surface tracking," published in ACM Transactions on Graphics (TOG)—Proceedings of ACM SIGGRAPH 2014, vol. 33, Issue 4, Jul. 2014, Article No. 112, 11 pages.
Da et al., "Double bubbles sans toil and trouble: discrete circulation-preserving vortex sheets for soap films and foams," ACM SIGGRAPH 2015, Transactions on Graphics, 34(4), 9 pages.
Da et al., "Surface-only liquids," SIGGRAPH '16 Technical Paper, Jul. 24-28, 2016, 12 pages.
Goldade, et al, "A practical method for high-resolution embedded liquid surfaces," Computer Graphics Forum 2016, The Eurographics Association and John Wiley & Sons Ltd., published by John Wiley & Sons Ltd., 10 pages.
Goswami et al, "Regional time stepping for SPH," Eurographics 2014, 4 pages.
Houston et al, "Gigantic deformable surfaces," ACM SIGGRAPH Sketches, 2005, 1 page.
Houston et al., "Hierarchical RLE level set: a compact and versatile deformable surface representation," ACM Transactions on Graphics, 25(1), 2006, 25 pages.
Houston et al, "RLE sparse level sets," ACM SIGGRAPH Sketches, 2004, 1 page.
Ju et al., "Dual contouring of Hermite Data," published ACM Transactions on Graphics (TOG)—Proceedings of ACM SIGGRAPH 2002, vol. 21, Issue 3, Jul. 2002, pp. 339-346.
Schmidt et al., "Adaptive mesh Booleans," (May 5, 2016) [online] (retrieved from https://arxiv.org/pdf/1605.01760.pdf), 10 pages.
Sriprasadh, "Developer desktop—non-regularized Booleans," (Mar. 17, 2017) [online] (retrieved from https://www.spatial.com/resources/developer-desktop-non-regularized-booleans), 3 pages.
Yue et al, "Continuum foam: a material point method for shear-dependent flows," ACM Transactions on Graphics, 34(5), 2015 presented at SIGGRAPH Asia 2015, 20 pages.
Unknown author, "CGAL 4.6.3—Manual: package overview," (Mar. 5, 2018) [online] (retrieved from https://doc.cgal.org-4.6.3/Manual/packages.html), 43 pages.
Unknown author, "GitHub—gilbo/cork: 3D Boolean / CSG library," (Mar. 5, 2018) [online] (retrieved from https://github.com/gilbo/cork), 2 pages.
Unknown author, "Isosurface—Wikipedia, the free encyclopedia," (Mar. 8, 2017) [online] (retrieved from https://en.wikipedia.org/wiki/Isosurface), 3 pages.
Unknown author, "Polygon mesh—Wikipedia, the free encyclopedia," (Mar. 8, 2017) [online] (retrieved from https://en.wikipedia.org/wiki/Polygon_mesh), 12 pages.
Unknown author, "Spatial introduces new graphical import component with the R23 release of 3D InterOp and 3D ACIS modeler," (Mar. 17, 2017) [online] (retrieved from https://www.spatial.com/news/spatial-introduces-new-graphical-import-component-r23-release-3d-interop-and-3d-acis-modeler), 5 pages.
Unknown author, "STL (file format)—Wikipedia, the free encyclopedia," (Mar. 14, 2017) [online] (retrieved from https://en.wikipedia.org/wiki/STL_(file_format)), 6 pages.
Unknown author, "Triangulation (geometry)—Wikipedia, the free encyclopedia," (Mar. 8, 2017) [online] (retrieved from https://en.wikipedia.org/wiki/Triangulation_(geometry)), 2 pages.

CREATING GRADIENTS OF DIFFERENT MATERIALS FOR THREE-DIMENSIONAL MODELS IN COMPUTER AIDED DESIGN APPLICATIONS

CROSS-REFERENCE TO RELATED APPLICATIONS

This application claims the benefit of U.S. Patent Application No. 62/475,473, entitled "CREATING GRADIENTS OF DIFFERENT MATERIALS FOR THREE-DIMENSIONAL MODELS IN COMPUTER AIDED DESIGN APPLICATIONS", filed Mar. 23, 2017.

BACKGROUND

This specification relates to computer aided structure creation, such as generation of three dimensional (3D) models for objects to be additively manufactured using multiple different materials.

Computer-aided design (CAD) software has been developed and used to generate 3D representations of objects. Such software has also included software tools that can be used to redesign and enhance 3D parts in ways that may require the use additive manufacturing techniques (i.e., 3D printing). Available additive manufacturing systems included 3D printers that employ granular techniques (e.g., Selective Laser Sintering (SLS) and Direct Metal Laser Sintering (DMLS)), extrusion techniques (e.g., Fused Filament Fabrication (FFF)), resin curing techniques (e.g., Stereolithography), or other computer aided manufacturing methods. Moreover, multi-material 3D printers are now available that are able to print different types of materials at different regions in space, including specified mixtures of material at different regions in space.

SUMMARY

This specification describes technologies relating to computer aided structure creation, such as generation of three dimensional (3D) models for objects to be additively manufactured using multiple different materials.

In general, one or more aspects of the subject matter described in this specification can be embodied in one or more methods that include a method performed by a three dimensional (3D) modeling program on a computer including a processor and a memory, the method including: obtaining a 3D surface model of an object to be 3D printed using different materials; specifying at least two distinct surface regions for the 3D surface model to correspond to the different materials; generating a 3D distance field within the 3D surface model, the 3D distance field extending from at least a first of the at least two distinct surface regions to at least a second of the at least two distinct surface regions; constructing isosurfaces along the 3D distance field within the 3D surface model at predefined values within the 3D distance field; breaking the 3D surface model into discrete volumetric regions using the isosurfaces; and assigning a material specification to each of the discrete volumetric regions for use in 3D printing the object using the different materials, each of the material specifications being either a single one of the different materials or a specified combination of the different materials.

Such methods can be implemented as operations to be performed by data processing apparatus in accordance with instructions (e.g., of a 3D modeling program) encoded on a non-transitory computer-readable medium. Likewise, such methods can be implemented using a system including a user interface device; and one or more computers operable to interact with the user interface device and programmed with three dimensional (3D) modeling software that performs the operations of the methods. Each of these method, computer-readable medium, and system implementations can include one or more of the following features.

Obtaining the 3D surface model can include receiving an input 3D mesh model composed of polygons (e.g., triangles). Specifying the at least two distinct surface regions can include identifying the at least two distinct surface regions on the 3D mesh model from respective contiguous groups of polygons marked by a user on the 3D mesh model. Alternatively or additionally, specifying the at least two distinct surface regions can include receiving user input defining distinct surface regions auxiliary to the 3D model.

Generating the 3D distance field can include defining an interpolation function that varies smoothly throughout an interior of the 3D surface model, from a value at the first of the at least two distinct surface regions to a value at the second of the at least two distinct surface regions. Generating the 3D distance field can also include assigning a value of zero to the first of the at least two distinct surface regions; and assigning a value of one to the second of the at least two distinct surface regions. Defining the interpolation function can include solving for a harmonic function using a grid-based solver with boundary conditions of zero and one specified for the first of the at least two distinct surface regions and the second of the at least two distinct surface regions, respectively. Further, constructing the isosurfaces along the 3D distance field within the 3D surface model can include constructing polygon meshes on isocontours of the interpolation function at the values defined by at least one predefined interval value (e.g., between zero and one).

Breaking the 3D surface model into the discrete volumetric regions can include attaching the isosurfaces to the 3D surface model using a non-regularized Boolean operation to form a non-manifold 3D surface model of the object. Constructing the isosurfaces along the 3D distance field within the 3D surface model can include limiting a minimum print distance between the isosurfaces to be greater than or equal to a minimum print resolution of a target additive manufacturing system. Assigning the material specification to each of the discrete volumetric regions can include assigning specified combinations of the different materials for interior volumetric regions in accordance with corresponding values of the 3D distance field. Moreover, each of the discrete volumetric regions can be a closed manifold to be 3D printed using the material specification, and the method can include sending the closed manifolds to an additive manufacturing system.

According to another aspect, a system can include an additive manufacturing machine (designed to use different materials in combination with each other when manufacturing objects), and the 3D modeling software can be configured to output the discrete volumetric regions to the additive manufacturing machine for additive manufacturing of the object with different material specifications for the discrete volumetric regions, the different material specifications forming a gradient of materials across the manufactured object. The system can include means for creating a discretized gradient for a three dimensional (3D) surface model of an object, to be manufactured using the additive manufacturing machine, by inserting one or more 3D surfaces into the 3D surface model at specified locations, thereby creating a non-manifold version of the 3D surface model having multiple discrete volumetric regions, and assigning a material specification to each of the discrete volumetric regions, each of the material specifications being either a single one of the different materials or a specified combination of the different materials, which are usable by the additive manufacturing machine to manufacture the object.

The means for creating the discretized gradient can include: means for generating a 3D distance field for the 3D surface model between at least two distinct surface regions identified for the 3D surface model; and means for inserting isosurfaces of the 3D distance field into the 3D surface model. The means for creating the discretized gradient can include means for inserting a 3D surface into the 3D surface model at regular intervals along an axis of the 3D surface model. The means for creating the discretized gradient can include means for inserting 3D surfaces, which are spheres of varying radius, into the 3D surface model at the specified locations.

Particular embodiments of the subject matter described in this specification can be implemented to realize one or more of the following advantages. The process of creating a gradient of materials across a 3D model of an object to be manufacturing using a multi-material 3D printer is facilitated. For example, a user can be enabled to readily create a model of a piecewise smooth gradient of materials (e.g., a gradient of color and/or a gradient of material properties) over a 3D region. The gradient model (e.g., going from one color to another, or from a hard plastic material to a soft rubber) can be created in a manner that is compatible with multi-material 3D printers that require each discrete solid volume to be composed of a homogenous material (e.g., sent as a set of STL files). The approach used can create a set of homogenous bands through the 3D model to approximate a smooth gradient while reducing the memory footprint of the software creating the gradient (e.g., as compared with a voxel grid based approach). Moreover, the created gradient can be interactively edited by the user before sending it to the 3D printer.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
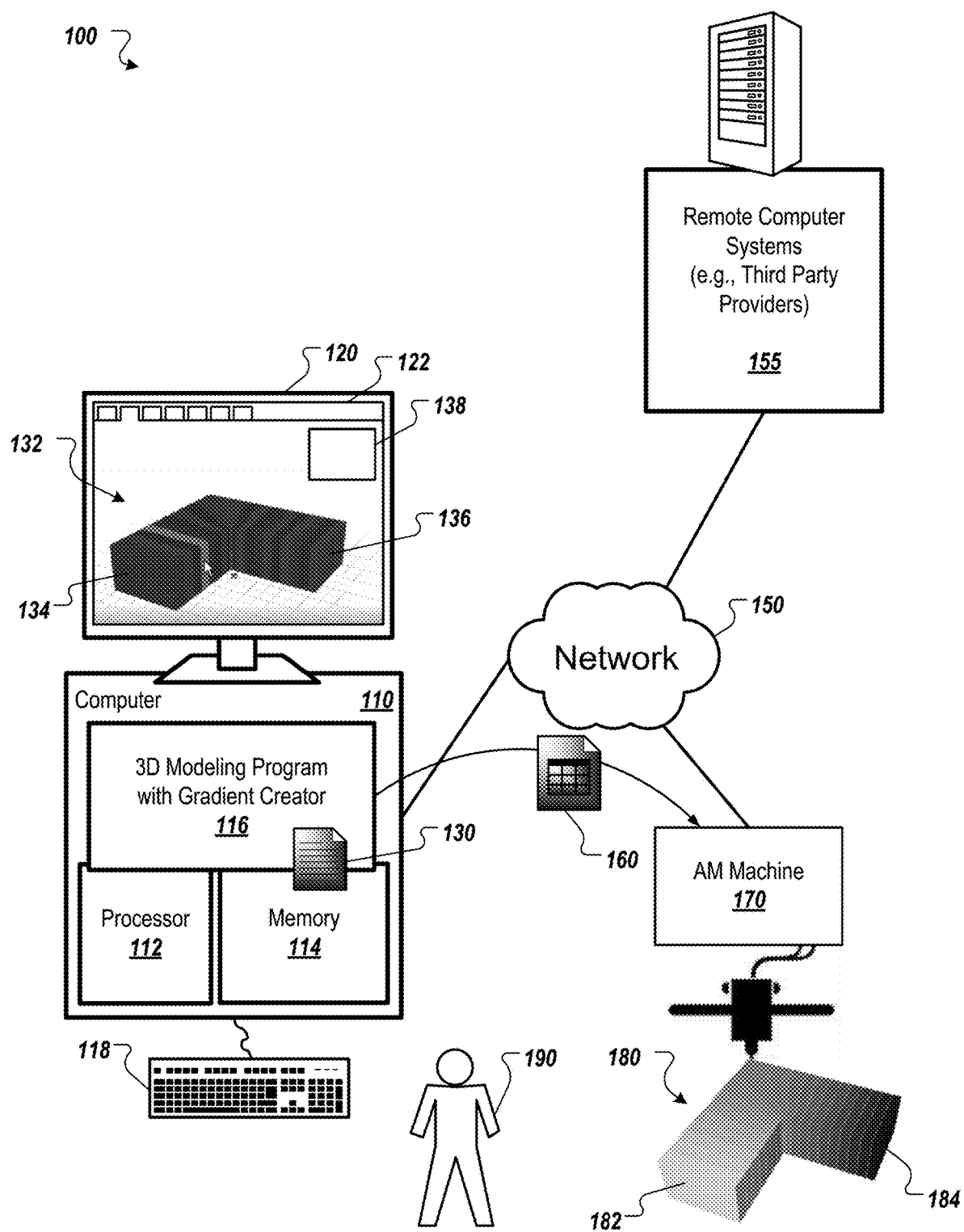
FIG. 1 shows an example of a system usable to design and manufacture objects with gradients of materials.

FIG. 1 shows an example of a system 100 usable to design and manufacture objects with gradients of materials. In the example shown, an additive manufacturing machine is used, but the invention is not limited to use with a particular type of manufacturing system. For example, the systems and techniques described herein can be used with various types of additive manufacturing (AM), three dimensional (3D) printing, subtractive manufacturing (SM), investment casting, and combinations thereof.

A computer 110 includes a processor 112 and a memory 114, and the computer 110 can be connected to a network 150, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112.

Such programs can include a 3D modeling program 116, which can run locally on computer 110, remotely on a computer of one or more remote computer systems 155 (e.g., one or more third party providers' one or more server systems accessible by the computer 110 via the network 150), or both. The 3D modeling program 116 presents a user interface (UI) 122 on a display device 120 of the computer 110, which can be operated using one or more input devices 118 of the computer 110 (e.g., keyboard and mouse). Note that while shown as separate devices in FIG. 1, the display device 120 and/or input devices 118 can also be integrated with each other and/or with the computer 110, such as in a tablet computer, where the one or more input devices 118 can include a touch screen display.

A user 190 can interact with the 3D modeling program 116 to obtain a 3D model 132. This can involve receiving the 3D model 132 from another program or subroutine and/or creating the 3D model 132 (from scratch or by modifying a loaded 3D model) using known graphical user interface tools. The 3D model 132 can be represented in the computer 110 as one or more surface models, such as a B-Rep (Boundary Representation), a surface mesh, an implicit surface (e.g., level set), or a combination of these. In addition, the UI 122 of the program 116 can allow the user 190 to provide input specifying at least two distinct surface regions 134, 136 of the 3D model 132 that will correspond to specific materials used to manufacture an object 180 from the 3D model 132. For example, in some implementations, the user 190 can select individual polygons (e.g., triangles) of a mesh and tag them with a group identifier, using a mesh editing tool.

Further, in some implementations, the distinct surface regions 134, 136 need not be on the 3D model 132. For example, the UI 122 of the program 116 can allow the user 190 to provide input specifying auxiliary surface regions that are distinct from each other and from the 3D model 132 (potentially completely outside the model 132 or potentially intersecting the model 132) where these auxiliary surface regions are assigned boundary values corresponding to the different materials. In general, the 3D modeling program 116 can be programed to provide one or more user interface elements 138 that enable the user to specify surface regions 134, 136 (on the model 132 and/or independent of the model 132) and corresponding materials for the 3D model 132.

In the example shown, the 3D model 132 is a right-angle block, where the two distinct surface regions 134, 136 are the two ends of the block. However, this simple 3D model 132 is used for ease of illustration only, and it will be appreciated that the systems and techniques described herein are applicable to many different shapes of 3D models. In particular, with additive manufacturing systems and techniques, there is opportunity to manufacture objects 180 with very complex structures, which would be very difficult to make using traditional manufacturing techniques. Thus, the specified surface regions 134, 136 on a more complex model 132 can be complex 3D surfaces, e.g., on the Stanford bunny (a commonly used 3D test model for computer graphics), the first surface region can be the ears and the second surface region can be the tail. Or one or both of the specified surface regions 134, 136 can be auxiliary surface regions, as noted above. Further, such objects 180 can be manufactured with a gradient of materials, e.g., from a first material 182 to a second material 184 through a series of discrete combinations of these materials, as shown in FIG. 1.

The 3D modeling program 116 initiates the creation of a gradient for the 3D model 132 by generating a 3D distance field within the 3D surface model 132. The 3D distance field extends from at least a first surface region 134 to a second surface region 136. In some implementations, the 3D distance field also extends to one or more additional surface regions. Moreover, note that each such region is a surface (albeit a 3D surface) because the region is defined as a surface on the 3D model (or as a modeled surface independent of the 3D model but in its coordinate system), and each such surface can be an exterior surface (e.g., a surface defined at an exterior portion of the object model, as shown in the example) or an interior surface (e.g., a surface defined at a location that is interior to the object model).

With the 3D distance field generated, the 3D modeling program 116 constructs isosurfaces along the 3D distance field within the 3D surface model at predefined values within the 3D distance field. In some implementations, the predefined values are defined by the user, e.g., through the one or more user interface elements 138. In some implementations, the predefined values are defined by the 3D modeling program 116 based on the 3D model 132, an AM machine 170, or a combination of these. For example, in some implementations, a minimum value is set for the distances between the isosurfaces, where that minimum value corresponds to the minimum print resolutions of the AM machine 170.

Once the isosurfaces are constructed (or as the isosurfaces are constructed) the 3D modeling program 116 breaks the original 3D surface model into volumetric regions using the isosurfaces, and the 3D modeling program 116 assigns a material specification to each of the discrete volumetric regions for use in 3D printing the object using the different materials. In the example shown in FIG. 1, a first of the discrete volumetric regions is assigned the first material 182, a last of the discrete volumetric regions is assigned the second material 184, and each of the discrete volumetric regions between the first and last regions is assigned a specified combination of the first and second materials 182, 184 (e.g., materials with different colors, such as red, green and blue plastics, to create a gradient of color, or materials with different properties, such as hard plastic and soft rubber, to create a gradient of structural characteristics).

The results of this gradient creation can be shown to the user 190 through the UI 122. The UI 122 can be designed to allow the user to undue the creation of the gradient, as well as allowing the user to create one or more additional gradients for the same 3D model 132. For example, the user 190 can create another gradient of material within the same portion of the model 132 that includes the first gradient of material, and/or the user 190 can create another gradient of material within a different portion of the model 132 that does not yet include a gradient.

Once the user 190 is satisfied with the model 132 and its gradient(s), the 3D model 132 can be stored as a document 130 and/or used to generate another representation of the model, e.g., an STL (STereoLithography) file for additive manufacturing. This can be done upon request by the user 190, or in light of the user's request for another action, such as sending the 3D model 132 to the AM machine 170, or other manufacturing machinery, which can be directly connected to the computer 110, or connected via a network 150, as shown. This can involve a post-process carried out on the local computer 110 or a cloud service to export the 3D model 132 to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files.

In any case, the 3D modeling program 116 can readily create at least one gradient of materials within the 3D model and provide a document 160 (of an appropriate format) to the manufacturing machine 170 to create a complete structure 180, including the gradient from the first material 182 to the second material 184. The manufacturing machine 170 can employ one or more additive manufacturing techniques, such as granular techniques (e.g., Selective Laser Sintering (SLS) and Direct Metal Laser Sintering (DMLS)), extrusion techniques (e.g., Fused Filament Fabrication (FFF)), and liquid resin curing techniques (e.g., Stereolithography), potentially in combination with subtractive or other computer aided manufacturing methods. In addition, the user 190 can save or transmit the 3D model 132, with the gradient, for later use. For example, the 3D modeling program 116 can store the document 130 that includes the 3D model 132 and its gradient(s).

Figure 2:
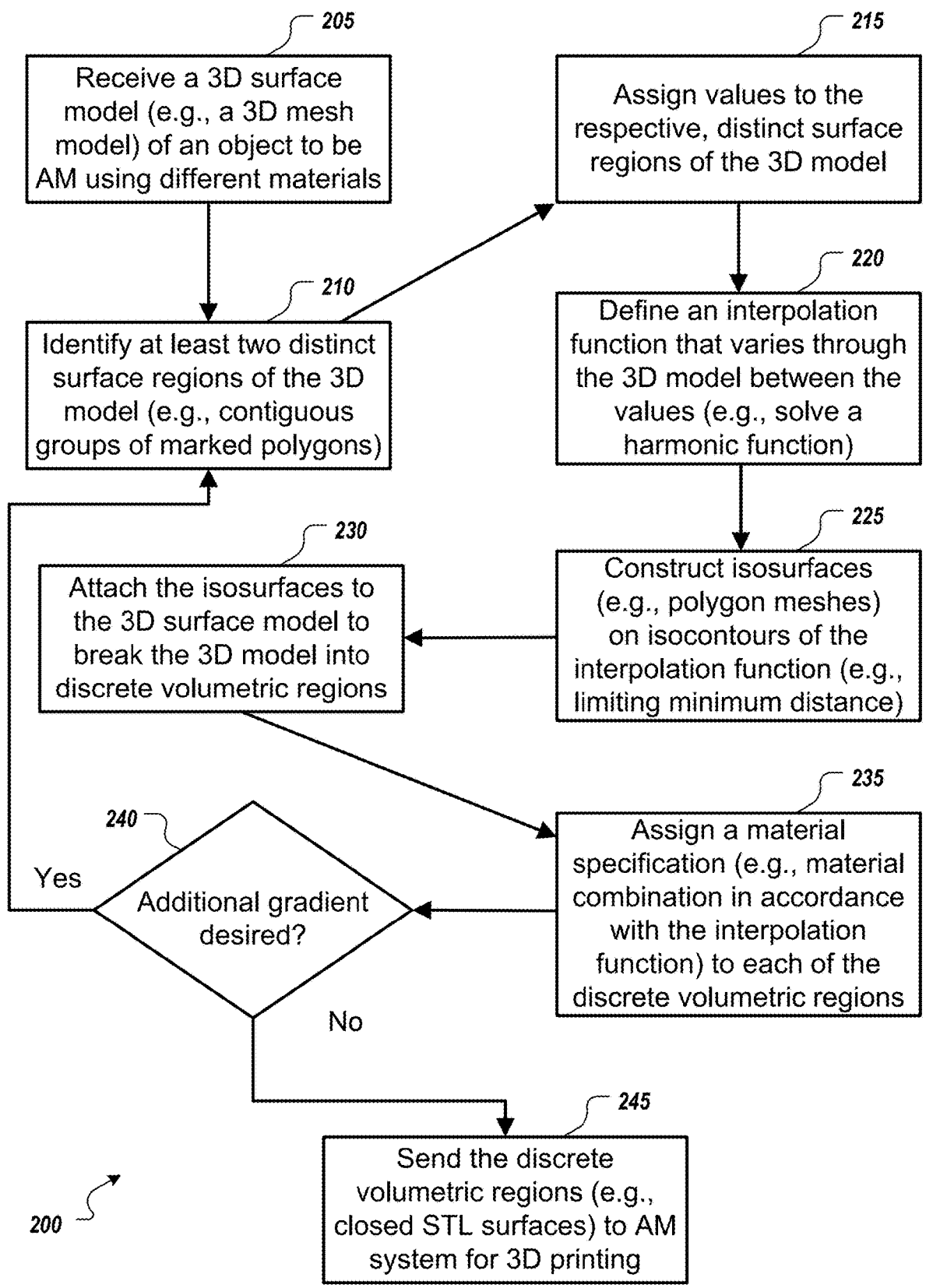
FIG. 2 shows an example of a process of generating a gradient of different materials for a 3D model.

FIG. 2 shows an example of a process 200 of generating a gradient of different materials for a 3D model. This process (or portions thereof) can be performed, for example, on the computer 110 (by 3D modeling program 116), on one or more remote computers 155 (by interaction with the 3D modeling program 116), or a combination of these. A 3D surface model is received 205, where the 3D surface model is an object to be additively manufactured using different materials. In some implementations, the 3D surface model is composed of one or more B-Reps. In some implementations, the 3D surface model is composed of one or more 3D mesh models made up of polygons (e.g., triangle meshes).

Two or more distinct surface regions of the 3D model are identified 210. In some cases, this identification is done in accordance with an automated process applied to the 3D model. In some cases, this identification is done in accordance with user input. For example, a user can select two regions of the model through a UI (e.g., by marking two separate sets of polygons in the mesh to be assigned to two different materials for manufacturing), and the program can then locate the distinct surface regions of the 3D model in accordance with the user selections (e.g., locate respective contiguous groups of polygons that fall within the two selected regions on the 3D mesh model).

Values are assigned 215 to the respective, distinct surface regions of the 3D model. These values can be in a range and correspond to amounts of different respective materials. For example, the values can be zero and one, where a value of zero indicates 0% of the second material and 100% of the first material, whereas a value of one indicates 100% of the second material and 0% of the first material. Other values can also be used provided that they can represent amounts of corresponding materials to be combined to form a gradient for the 3D model. More than two materials can be designated. For example, the gradient can go from a starting point of 20% of a first material and 80% of a second material, to an ending point of 20% of the first material and 80% of a third material. Moreover, the value assignment can be automatic or done under user control.

Figure 3A:
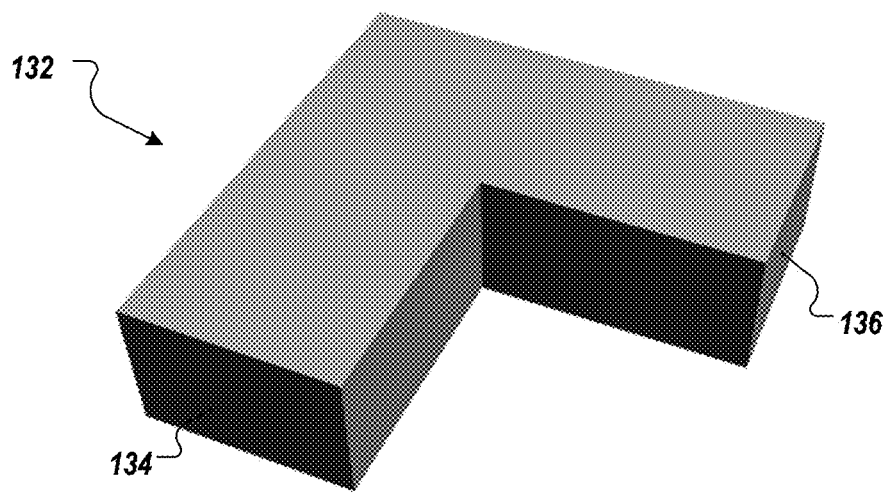
FIGS. 3A-3D show an example of a 3D model for which a gradient of different materials is created.
Figure 3B:
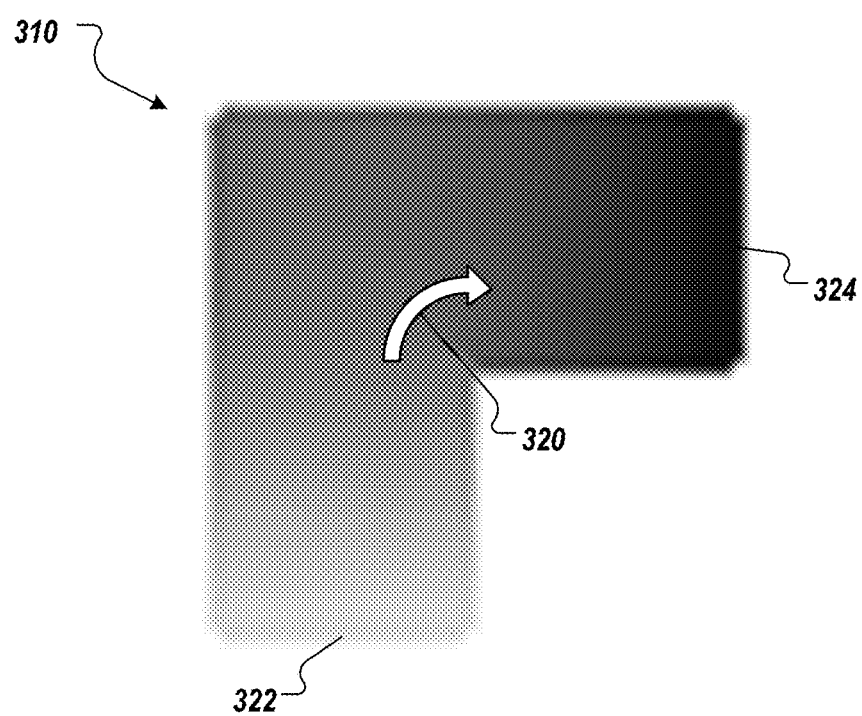

With the values assigned, an interpolation function is defined 220, where the interpolation function varies through the 3D model between the assigned values. For example, in some implementations, the interpolation function is defined so that the function varies smoothly throughout the interior of the 3D surface model from zero at a first identified surface region to one at a second identified surface region. FIGS. 3A-3B show an example of a 3D model 132 for which an interpolation function is defined. In FIG. 3A, the 3D model 132 from FIG. 1 is shown with two identified surface regions 134, 136 being on either side of the right-angle block of the model 132.

Defining the interpolation function for this 3D model 132 allows a value to be generated from the interpolation function for any and all 3D points within the 3D model, i.e., a 3D distance field of values that smoothly vary within the 3D space between the two assigned value extremes (e.g., zero and one). FIG. 3B shows a slice 310 (in the X-Y plane) of this 3D distance field. As shown in FIG. 3B, the values vary smoothly 320 throughout the field starting from a first assigned value 322 (represented by a light coloration in the figure and corresponding to the material 182 to be used at adjacent surface region 134) and ending at a second assigned value 324 (represented by a dark coloration in the figure and corresponding to the material 184 to be used at adjacent surface region 136).

In some implementations, defining the interpolation function includes solving for a harmonic function. For example, the interpolation function can be a numerically-solved harmonic interpolation function. In some implementations, the interpolation function (e.g., the harmonic interpolation function) is solved using a grid-based solver with boundary conditions of zero and one specified for the first and second identified surface regions, respectively. For example, if the user creates triangle groups j and k (by marking two contiguous groups of triangles on the 3D model) the software can solve for a function φ such that $\nabla^2 \varphi = 0$ on the interior of the model, φ=1 at triangles in group j, rp=0 at triangles in group k, and the normal derivative, Λφ n, is zero elsewhere. This produces a pseudo-distance function from group j to k (i.e., φ is smooth and non-negative on the interior) whose isocontours can be meshed using dual contouring and then attached to the 3D model.

Various types of partial differential equation (PDE) solvers can be used to provide a smooth 3D distance field that stays between the two extreme values (e.g., zero and one). For example, the software can solve for φ using finite differences on a regular grid. However, other approaches include using a Boundary Element Method solver rather than a volumetric harmonic solver to potentially eliminate dependence on a volumetric data structure. In any case, using a harmonic interpolation function can provide a well behaved function that varies smoothly throughout the 3D model between the two extremes, without creating internal islands in the 3D model where the slope of the gradient changes direction (sign) over a region within the 3D model.

Other approaches are also possible. For example, a biharmonic function can be used. Such an approach can provide more control over behavior around boundaries, but can result in a less smooth 3D distance field. Another approach is to use mean value coordinates interpolation techniques. However, such an approach can result in a 3D distance field that goes below or above the two extreme values (e.g., zero and one). This issue can be addressed by appropriate threshold testing and cutoff/clamping of the values obtained by the 3D distance field.

Referring again to FIG. 2, isosurfaces are constructed 225 along the 3D distance field within the 3D surface model. Note that an isosurface represents points of a constant value within a volume of space (in this case, within the 3D distance field for the 3D surface model). The specific values used as the constants with the 3D distance field are predefined by the time the isosurfaces are constructed. In various implementations, the specific values are defined using an interval value (or range), a slices number (or range), a minimum print resolution (e.g., of a target additive manufacturing machine), or a combination of the foregoing. In addition, these inputs used to create the specific values for construction of isosurfaces can be provided automatically by the software, through user input, or both (e.g., a default value provided by the software, which can be changed by user input).

An interval value (or range of acceptable interval values) can be used to define the constants for construction of isosurfaces by stepping through the range of values from the first assigned value 322 to the second assigned value 324 (e.g., an interval value of 0.2 for a range of 3D field values from zero to one, results in predefined constants for the isosurfaces of 0.2, 0.4, 0.6, and 0.8; an interval value of 0.1 for a range of 3D field values from zero to one, results in predefined constants for the isosurfaces of 0.1, 0.2, 0.3, 0.4, 0.5, 0.6, 0.7, 0.8, and 0.9; etc.). A slices number (or range of acceptable slices numbers) can be used to define the constants for construction of isosurfaces by dividing the numerical range between the first assigned value 322 and the second assigned value 324 by the slices number and multiplying the result by the numbers one through the slice number minus one (e.g., a slice number of 20, for a range of 3D field values from zero to one, results in predefined constants for the isosurfaces of 0.05, 0.10, 0.15, 0.20, 0.25, 0.30, 0.35, 0.40, 0.45, 0.50, 0.55, 0.60, 0.65, 0.70, 0.75, 0.80, 0.85, 0.90, and 0.95). Note that this approach is in some ways equivalent to an interval value (e.g., 20 slices is equivalent to an interval value of 0.05). Note that other slice numbers can be used that do not evenly divide into the range of the 3D distance field (e.g., 12 slices or 14 slices).

Moreover, although the approaches described above involve evenly spaced slices along the 3D distance field, this is not required. In some implementations, the spacing of the isosurfaces within the 3D distance field can vary along that 3D distance field. For example, the constant values used to define the isosurfaces within the 3D distance field can be selected in accordance with a formula (e.g., an exponential equation or a quadratic equation) that can be provided by the software, defined by a user, or both. Other approaches to generating the interior slices of the 3D model are also possible. For example, copies of a planar mesh patch can be inserted at regular intervals along a particular axis in order to achieve a directional gradient. As another example, an implicit sphere of varying radius can be meshed and inserted to achieve a radial gradient.

Figure 3C:
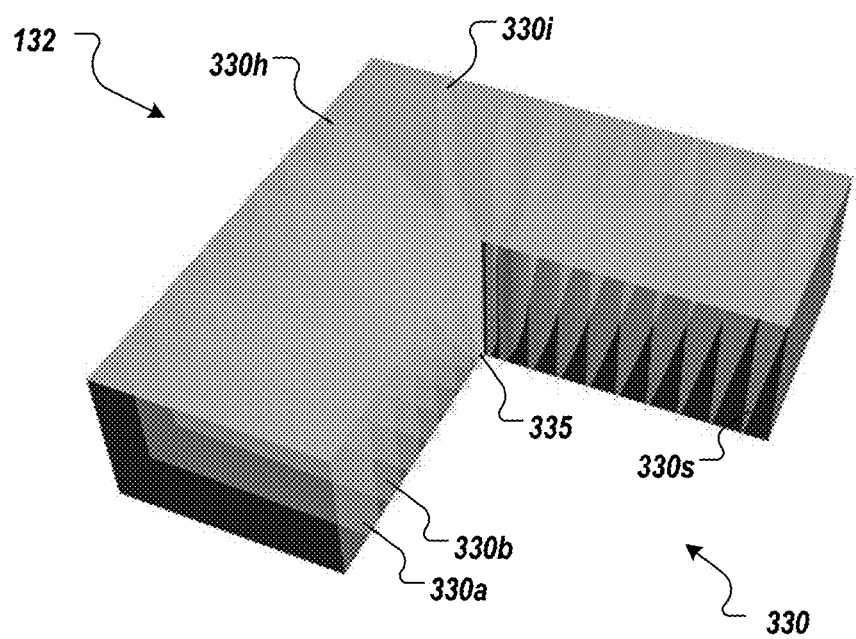

FIG. 3C shows an example of isosurfaces 330 constructed for the 3D model 132 using a slice number of 20 and the 3D distance field 310 from FIG. 3B. The isosurfaces 330 are thus nineteen in number and include a first isosurface 330a, a second isosurface 330b, through to a nineteenth isosurface 330s. The specific approach to constructing the isosurfaces will depend in part on the manner in which the 3D model is represented and manipulated in computer memory. In some implementations, constructing the isosurfaces along the 3D distance field within the 3D surface model 132 involves constructing polygon meshes (e.g., triangle meshes) on isocontours of the interpolation function (e.g., extracting isocontours from the harmonic function) at the predefined values (e.g., the values defined by at least one predefined interval value between zero and one).

In some implementations, the construction of the isosurfaces 330 takes into account the size of the 3D model 132 that will be broken up with the isosurfaces. For example, a minimum distance (in the 3D model space) between isosurfaces can be imposed to prevent the resulting slices of the 3D model from becoming too thin. The minimum distance can be set equal to a minimum print resolution of a target 3D printer. Thus, as shown in FIG. 3C, if the isosurfaces 330h, 330i result in a distance 335 between them (at some point in the 3D model 132) that is less than the minimum print resolution, then an adjustment will be made to prevent the model 132 from being sliced too thinly.

When such a minimum distance requirement is violated, the isosurfaces can be reconstructed (either all of them, or only the specific isosurfaces that are too close together) or localized adjustments can be made to the isosurfaces. For example, when each isosurface 330 is represented as a polygon mesh, localized modifications to the polygon mesh can eliminate the minimum distance violation. It should be noted that such a modification to an isosurface will technically cause it to no longer be an isosurface with respect to the 3D distance field, but such a modified isosurface will still serve the same function for the purposes of this disclosure, and thus such a modified isosurface is defined to be an isosurface since it started as a true isosurface.

Once constructed, each respective isosurface is used (either serially or in parallel) to break the 3D surface model into discrete volumetric regions. Referring again to FIG. 2, in some implementations, this involves attaching 230 the isosurfaces to the 3D surface model using a non-regularized Boolean operation to form a non-manifold 3D surface model of the object (e.g., a non-manifold triangle mesh). For example, the isocontours of the 3D (pseudo) distance field can be iteratively meshed, going from one surface region to another; a non-regularized Boolean operation can be performed on the original model and each meshed isocontour, and triangles that are outside of the original model can be discarded.

Figure 3D:
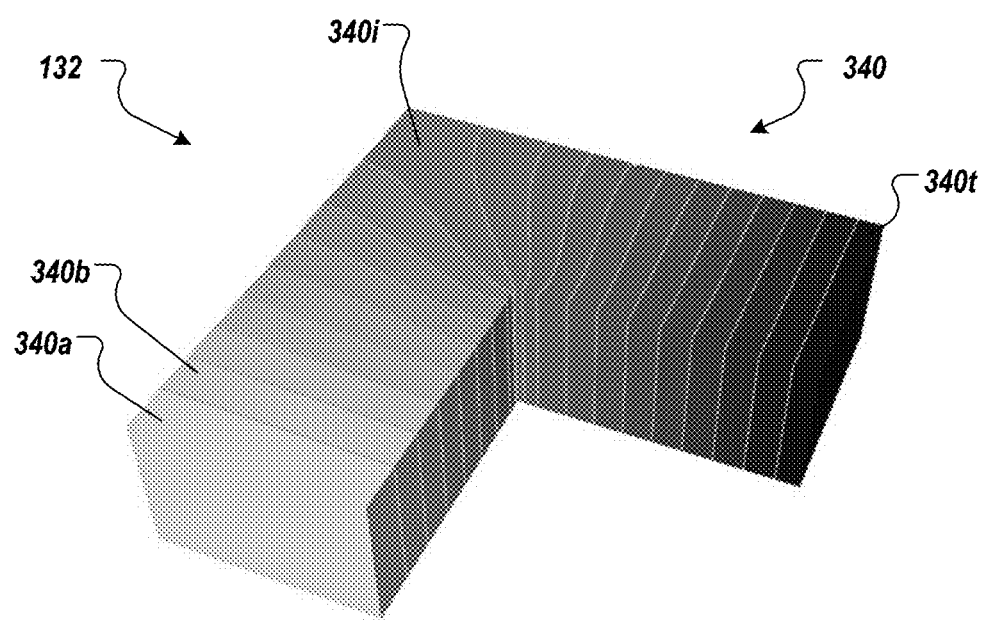

A material specification is assigned 235 to each of the discrete volumetric regions. For example, the two exterior volumetric regions can be assigned two different materials, respectively, and each of the interior volumetric regions can be assigned a specified combination of the two different materials in accordance with corresponding values of the 3D distance field. FIG. 3D shows an example of the 3D model 132 after merging isosurfaces with the original 3D model 132 (shown in FIG. 3A) to thereby create multiple volumetric regions 340. Further, varying materials are assigned to each of these volumetric regions 340.

In the example shown, a first volumetric region 340a is assigned 100% of a first material 182, a last volumetric region 340t is assigned 100% of a second material 184, and the remaining volumetric regions there between are assigned mixtures of the two materials specified by the interval value and/or the slice number for the 3D distance field. For example, each interior volumetric region can be assigned a mixture of materials in accordance with:

Percentage of first material=100%−100×volumetric region #/(slice #−1)

Percentage of second material=0%+100×volumetric region #/(slice #−1)

These percentages can also be rounded to the nearest percent. Thus, in the example shown in FIG. 3D, a first interior volumetric region 340b is assigned 95% of the first material 182 (100%−100×1/19) plus 5% of the second material 184 (0%+100×1/19), and an eighth volumetric region 340i is assigned 58% of the first material 182 (100%−100×8/19) plus 42% of the second material 184 (0%+100×8/19). Other approaches to assignment of percentages of the different materials are also possible. For example, the percentages can be set by averaging (or finding the median of) the values of the 3D distance field corresponding to a given volumetric region.

Moreover, in some implementations, the exterior volumetric regions 340a, 340t are also assigned a mixture of materials, rather than being 100% one material or the other (e.g., when auxiliary surfaces are used as the bounds for the gradient). Further, in some implementations, any suitable one dimensional function with a domain and range that match the 3D distance field (e.g., with domain [0, 1] and range [0, 1]) can be used to specify the mixture of two materials. For example, the one dimensional function can be $f(x)=x^2$. In such implementations, the final material can be assigned using: $M(p)=f(p)*M1+(1−f(p))*M2$, where M1 and M2 are the two materials being mixed, and p is the value of the interpolation function (e.g., the harmonic function) inside a given slice of the model. Finally, in some implementations, a predefined set of n materials can be selected (e.g., by the user), and the gradient generator can be configured to produce n slices, and then map the n materials to the n slices.

Regardless of the specific approach taken for assigning percentages of the different materials, a gradient of different materials is created for the 3D model. Referring again to FIG. 2, a check 240 can be made as to whether an additional gradient is desired. If so, the process returns to identifying 210 distinct surface regions of the 3D model to use as beginning and end points for the gradient. As noted above, each new gradient can be for an entirely new portion of the 3D model or can overlap (partially or entirely) with a previous generated gradient. For example, in some implementations, a second set of isosurface meshes for a second gradient is inserted into both the original exterior mesh of the 3D model and also the existing isosurfaces from the first gradient, and then material specifications can be assigned in accordance with the indicated mixtures of the two, three, or four different materials.

Once all the desired gradients have been generated by breaking the 3D model up into various discrete volumetric regions, these discrete volumetric regions can be sent 245 to an additive manufacturing system (e.g., a 3D printer device) to manufacture the object corresponding to the 3D model. Each discrete volumetric region is a closed manifold to be 3D printed using the material specification for that volumetric region. For example, each discrete volumetric region can be a closed STL surface output to a 3D printer. In some implementations, the 3D surface model is stored and manipulated as a non-manifold mesh, and each closed manifold is identified by traversing the non-manifold mesh to identify boundaries (non-manifold edges) and separate out the closed manifolds (defining the discrete volumes) based on those boundaries.

Figure 4:
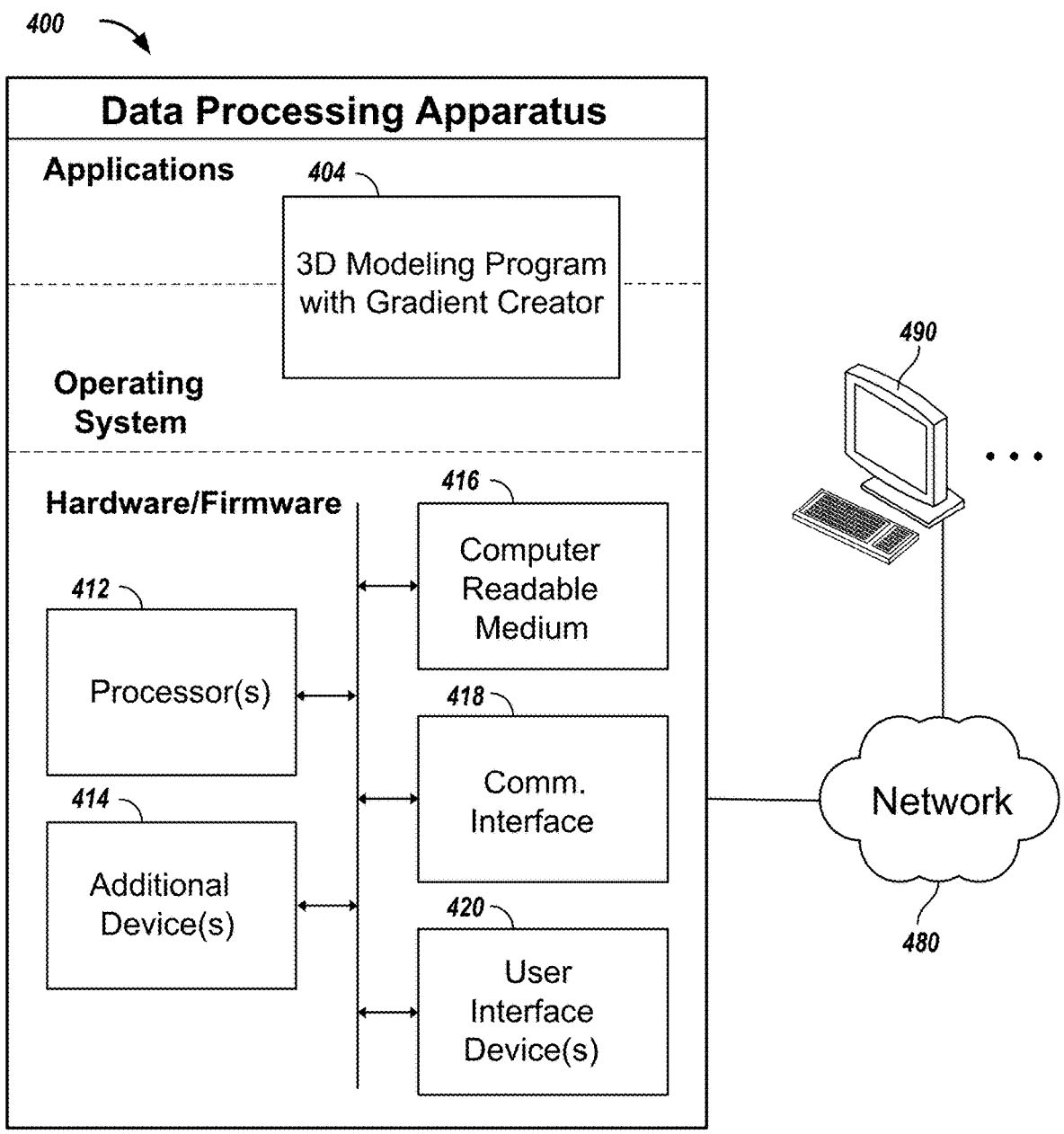
FIG. 4 is a schematic diagram of a data processing system, which can be used to implement the systems and techniques described herein.

FIG. 4 is a schematic diagram of a data processing system including a data processing apparatus 400, which can be programmed as a client or as a server. The data processing apparatus 400 is connected with one or more computers 490 through a network 480. While only one computer is shown in FIG. 4 as the data processing apparatus 400, multiple computers can be used. The data processing apparatus 400 includes various software modules, which can be distributed between an applications layer and an operating system. These can include executable and/or interpretable software programs or libraries, including tools and services of a 3D modeling program 404, such as described above, with gradient creator. The number of software modules used can vary from one implementation to another. Moreover, the software modules can be distributed on one or more data processing apparatus connected by one or more computer networks or other suitable communication networks.

In some implementations, the 3D modeling program 404 takes a 3D model (as input or when created by the user) in the form of a mesh (e.g., a triangle mesh surface) and produces a non-manifold surface mesh, with regularly spaced interior surfaces inserted throughout the 3D model. The regions between these interior surfaces have material properties that vary gradually, in a step wise manner, from one material to another, thus approximating a continuous material gradient through the object created from the 3D model. This can also be referred to as a discretized gradient since the continuous gradient is discretized into a sequence of closed manifolds, with each manifold in the sequence having a uniform material, but the material varies from one manifold to the next in the sequence in accordance with the desired material gradient. Thus, each object sent to a 3D printer is to be constructed from a uniform material, but over the course of the whole 3D print, the material (properties and/or color) gradually shift from one extreme to another.

Each closed manifold of such a sequence can be made as a relatively thin object, thus allowing the discretized gradient to get very close to a continuous material gradient. In addition, note that the 3D model need not represent a completely solid object, but can include voids therein, which can be specified by the 3D model itself or be generated for the 3D model (e.g., internal lattices can be generated to fill one or more spaces within the 3D model, or infill material can be added automatically when the 3D model is prepared for 3D printing with one or more portions of the 3D model being specified for infill rather than solid construction).

Moreover, in some implementations, the 3D modeling program 404 creates each such gradient by attaching isosurfaces to a mesh model, thus creating a non-manifold mesh model of the object. The 3D modeling program 404 can be programmed to allow user editing of the 3D model in the form of such a non-manifold mesh model. For example, a mesh editing tool can be extended to handle non-manifold meshes, so the user can continue to edit objects after they have been converted from single-solid to complex objects, e.g., through a non-regularized Boolean operation, which doesn't fully discard mesh polygons (e.g., triangles) to complete a Boolean operation. In other words, the intersection contours are found, and the necessary mesh surgery is performed to join the two input surfaces at these contours; this results in a non-manifold surface that bounds multiple discrete regions, which is the same class of surface that can be used for multi-material modeling by the 3D modelling program.

Moreover, the use of such complex surface types (also referred to as "cellular topology") facilitates the operation of the 3D modeling program in creating and editing the gradients. This type of complex object is composed of two or more solid regions bounded by a single non-manifold surface; adjacent solid regions are separated by a single patch of triangles (these surface patches are referred to as "interior surfaces"). The advantage to treating discrete regions as one object is that modeling operations do not need to ensure that separate surface patches are precisely aligned at all times. If separate solid models were used, it would be possible to introduce overlaps or air gaps between surfaces as they deform or are remeshed.

In some implementations, the non-regularized Boolean can be computed in a manner similar to the adaptive mesh approach to computing mesh Booleans described in Schmidt et al., "Adaptive mesh Booleans", published online in 2016 at http://arxiv.org/abs/1605.01760. However, since mesh patches need not be discarded, more than two boundaries should be joined at once. Thus, the algorithm can be as follows:

1. detect intersection contours of two surfaces;
2. remove intersecting triangles from each surface, resulting in a set of boundaries corresponding to each intersection contour (possibly more than two boundaries per contour);
3. perform an advancing-front style mesh evolution to move each set of boundaries towards the other boundaries as well as the intersection contour;
4. when the distances between boundaries are small enough, run a gap-closing algorithm (e.g., as described in Borodin et al., "Progressive gap closing for mesh repairing", published in Advances in Modelling, Animation and Rendering, Springer, 2002, pp. 201-213) which will refine boundary edges to ensure a one-to-one vertex correspondence; this is run pair-wise on all boundaries until a consistent set of vertex matches is achieved, and zippering the boundaries together is then trivial.

Note that a challenge of this approach is in evolving multiple boundaries towards each other simultaneously/concurrently, and in matching the final boundaries so that they can be easily stitched together by merging vertices. For the final step, pair-wise iterations of gap-closing, followed by refining arbitrary edges until the number of vertices in each boundary is equal, has been found to be very effective. Modifying the advancing-front mesh evolution of Schmidt et al., "Adaptive mesh Booleans", from handling a pair of boundaries to an arbitrary set of boundaries results in an algorithm that can be easier to implement than algorithms that depend on robust intersection testing and construction. Moreover, this approach does not require geometrically exact predicates (conservative bounds are sufficient), or complicated combinatorial operations.

If both input models are closed surfaces, consistent front and back group identifiers can be generated automatically by determining which triangles from model A are inside model B, and vice-versa. This is useful for subsequently selecting and deleting surface patches, as well as for splitting the model up in order to send it to the 3D printer. Further, in some implementations, the 3D model is represented using a non-manifold triangle mesh data structure with additional data associated with each triangle. Each triangle is given two integer identifiers, corresponding to the front and back of the triangle (as defined by the triangle winding order.) Triangles on the exterior surface of the object have a reserved integer value representing the space entirely outside of the object. For further details regarding the use of non-manifold surface models for 3D modelling of multi-material objects, see U.S. Patent Pub. No. 2017/0061036, filed Aug. 31, 2015, published Mar. 2, 2017, and titled "MODELING A THREE-DIMENSIONAL OBJECT HAVING MULTIPLE MATERIALS", which application is hereby incorporated by reference. Further, when it is time for 3D printing, the 3D modeling program 404 splits the non-manifold mesh model into a number of manifold meshes (e.g., a set of STL objects) that can be sent to a 3D printer.

The data processing apparatus 400 also includes hardware or firmware devices including one or more processors 412, one or more additional devices 414, a computer readable medium 416, a communication interface 418, and one or more user interface devices 420. Each processor 412 is capable of processing instructions for execution within the data processing apparatus 400. In some implementations, the processor 412 is a single or multi-threaded processor. Each processor 412 is capable of processing instructions stored on the computer readable medium 416 or on a storage device such as one of the additional devices 414. The data processing apparatus 400 uses its communication interface 418 to communicate with one or more computers 490, for example, over a network 480. Thus, in various implementations, the processes described can be run in parallel or serially, on a single or multi-core computing machine, and/or on a cluster/cloud, etc.

Examples of user interface devices 420 include a display, a camera, a speaker, a microphone, a tactile feedback device, a keyboard, and a mouse. The data processing apparatus 400 can store instructions that implement operations associated with the modules described above, for example, on the computer readable medium 416 or one or more additional devices 414, for example, one or more of a floppy disk device, a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired network, a wireless network, or both. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, the actions recited in the claims can be performed in a different order and still achieve desirable results.

What is claimed is:

1. A method performed by a three dimensional (3D) modeling program on a computer comprising a processor and a memory, the method comprising:
    obtaining a 3D surface model of an object to be 3D printed using different materials;
    specifying at least two distinct surface regions for the 3D surface model to correspond to the different materials;
    generating a 3D distance field within the 3D surface model, the 3D distance field extending from at least a first of the at least two distinct surface regions to at least a second of the at least two distinct surface regions;
    constructing isosurfaces along the 3D distance field within the 3D surface model at predefined values within the 3D distance field;
    breaking the 3D surface model into discrete volumetric regions using the isosurfaces; and
    assigning a material specification to each of the discrete volumetric regions for use in 3D printing the object using the different materials, each of the material specifications being either a single one of the different materials or a specified combination of the different materials.

2. The method of claim 1, wherein obtaining the 3D surface model comprises receiving an input 3D mesh model comprising polygons.

3. The method of claim 2, wherein specifying the at least two distinct surface regions comprises identifying the at least two distinct surface regions on the 3D mesh model from respective contiguous groups of polygons marked by a user on the 3D mesh model.

4. The method of claim 1, wherein generating the 3D distance field comprises:
    assigning a value of zero to the first of the at least two distinct surface regions;
    assigning a value of one to the second of the at least two distinct surface regions; and
    defining an interpolation function that varies throughout an interior of the 3D surface model, from the value of zero at the first of the at least two distinct surface regions to the value of one at the second of the at least two distinct surface regions.

5. The method of claim 4, wherein defining the interpolation function comprises solving for a harmonic function using a grid-based solver with boundary conditions of zero and one specified for the first of the at least two distinct surface regions and the second of the at least two distinct surface regions, respectively.

6. The method of claim 4, wherein constructing the isosurfaces along the 3D distance field within the 3D surface model comprises constructing polygon meshes on isocontours of the interpolation function at the values defined by at least one predefined interval value between zero and one.

7. The method of claim 1, wherein breaking the 3D surface model into the discrete volumetric regions comprises attaching the isosurfaces to the 3D surface model using a non-regularized Boolean operation to form a non-manifold 3D surface model of the object.

8. The method of claim 7, wherein constructing the isosurfaces along the 3D distance field within the 3D surface model comprises limiting a minimum print distance between the isosurfaces to be greater than or equal to a minimum print resolution of a target additive manufacturing system.

9. The method of claim 7, wherein assigning the material specification to each of the discrete volumetric regions comprises assigning specified combinations of the different materials for interior volumetric regions in accordance with corresponding values of the 3D distance field.

10. The method of claim 7, wherein each of the discrete volumetric regions is a closed manifold to be 3D printed using the material specification, and the method comprises sending the closed manifolds to an additive manufacturing system.

11. A non-transitory computer-readable medium encoding instructions of a three dimensional (3D) modeling program operable to cause data processing apparatus to perform operations comprising:
    obtaining a 3D surface model of an object to be 3D printed using different materials;

specifying at least two distinct surface regions for the 3D surface model to correspond to the different materials;

generating a 3D distance field within the 3D surface model, the 3D distance field extending from at least a first of the at least two distinct surface regions to at least a second of the at least two distinct surface regions;

constructing isosurfaces along the 3D distance field within the 3D surface model at predefined values within the 3D distance field;

breaking the 3D surface model into discrete volumetric regions using the isosurfaces; and assigning a material specification to each of the discrete volumetric regions for use in 3D printing the object using the different materials, each of the material specifications being either a single one of the different materials or a specified combination of the different materials.

12. The non-transitory computer-readable medium of claim 11, wherein obtaining the 3D surface model comprises receiving an input 3D mesh model comprising polygons.

13. The non-transitory computer-readable medium of claim 11, wherein generating the 3D distance field comprises defining an interpolation function that varies throughout an interior of the 3D surface model between the first of the at least two distinct surface regions and the second of the at least two distinct surface regions.

14. The non-transitory computer-readable medium of claim 11, wherein breaking the 3D surface model into the discrete volumetric regions comprises attaching the isosurfaces to the 3D surface model using a non-regularized Boolean operation to form a non-manifold 3D surface model of the object.

15. The non-transitory computer-readable medium of claim 14, wherein constructing the isosurfaces along the 3D distance field within the 3D surface model comprises limiting a minimum print distance between the isosurfaces to be greater than or equal to a minimum print resolution of a target additive manufacturing system.

16. The non-transitory computer-readable medium of claim 14, wherein each of the discrete volumetric regions is a closed manifold to be 3D printed using the material specification, and the operations comprise sending the closed manifolds to an additive manufacturing system.

17. A system comprising:
an additive manufacturing machine designed to use different materials in combination with each other when manufacturing objects; and means for creating a discretized gradient for a three dimensional (3D) surface model of an object, to be manufactured using the additive manufacturing machine, by inserting one or more 3D surfaces into the 3D surface model at specified locations, thereby creating a non-manifold version of the 3D surface model having multiple discrete volumetric regions, and assigning a material specification to each of the discrete volumetric regions, each of the material specifications being either a single one of the different materials or a specified combination of the different materials, which are usable by the additive manufacturing machine to manufacture the object.

18. The system of claim 17, wherein the means for creating the discretized gradient comprises:
means for generating a 3D distance field for the 3D surface model between at least two distinct surface regions identified for the 3D surface model; and means for inserting isosurfaces of the 3D distance field into the 3D surface model.

19. The system of claim 17, wherein the means for creating the discretized gradient comprises means for inserting a 3D surface into the 3D surface model at regular intervals along an axis of the 3D surface model.

20. The system of claim 17, wherein the means for creating the discretized gradient comprises means for inserting 3D surfaces comprising spheres of varying radius into the 3D surface model at the specified locations.

* * * * *